Patented Aug. 26, 1924.

1,506,728

UNITED STATES PATENT OFFICE.

ARTHUR LACHMAN, OF SAN FRANCISCO, CALIFORNIA, ASSIGNOR TO NATIONAL ANILINE & CHEMICAL COMPANY, INC., OF NEW YORK, N. Y., A CORPORATION OF NEW YORK.

METHOD OF MANUFACTURING NITROTARTARIC ACID.

No Drawing. Application filed September 13, 1921. Serial No. 500,439.

*To all whom it may concern:*

Be it known that I, ARTHUR LACHMAN, a citizen of the United States, residing at the city and county of San Francisco and State of California, have invented new and useful Improvements in Methods of Manufacturing Nitrotartaric Acid, of which the following is a specification.

This invention relates to a method of manufacturing nitrotartaric acid and like products, and especially to a method of dissolving the tartaric acid before mixing with nitric and sulphuric acid is resorted to, and further to a method of heat control while the dissolved tartaric acid is subjected to the action of the nitric and sulphuric acid.

When nitric acid acts upon organic hydroxyl compounds, like glycerine, to form a so called "nitro compound" which is really an "ester of nitric acid," water is separated at the same time.

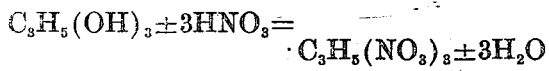

The water thus formed tends to dilute the remaining nitric acid, and thus slows down or even stops the action. It is therefore customary to mix the nitric acid with strong sulphuric acid to absorb the water, and to employ as strong a nitric acid as possible, to minimize this action of water.

Tartaric acid, which is also a hydroxyl compound, forms a "nitrotartaric acid" in the same manner:

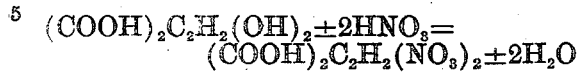

In that case however there are technical difficulties. Tartaric acid is only slightly soluble in a mixture of sulphuric and nitric acids and time periods often exceeding twenty hours or more are required to bring about the nitration of the tartaric acid.

The two most common methods in use today are as follows:

First, tartaric acid is dissolved in pure nitric acid and after it has been dissolved, sulphuric acid is added. This method is open to two serious objections: first, pure, strong nitric acid is very corrosive, and while it can be readily handled in the laboratory by stirring it in glass or porcelain vessels, it is seldom or never employed in pure form in factories, but always as a mixture with sulphuric acid; this mixture being technically known as "mixed acid." Second, the product obtained in this manner is a thick, heavy paste from which the excess of sulphuric and nitric acids cannot be removed, except with great difficulty and loss.

The second method in use today operates about as follows: Finely powdered tartaric acid is added to a mixed acid, to-wit, nitric and sulphuric acid, and agitated for a long period, often exceeding twenty hours or more. During this time the heavy paste, previously referred to, is obtained. A mechanical agitator or mixer is required to maintain agitation during this extended time period and as the paste increases in thickness, it is obvious that a great deal of power is consumed by the mechanically operated agitating mechanism. The excess of sulphuric and nitric acids cannot be removed except without great difficulty and loss; further there is no way of insuring the complete solution of the tartaric acid, and it is therefore obvious that the yield of nitrotartaric acid is variable and uncontrollable.

The present invention involves a method which is exceedingly simple and in which the time element involved is reduced to a minimum. The method consists in first dissolving the tartaric acid in water, preferably boiling, then allowing this solution to run into the "mixed acid", to-wit, nitric and sulphuric acid. Considerable heating will take place while the dissolved tartaric acid is being added, but such heat produced is carried away by cooling coils or the like. In fact actual experience has shown that only moderate cooling is required and that the best results are obtained when the entire mixture is maintained at a temperature approximating 75 degrees centigrade. The entire mixture is thoroughly agitated by mechanical means or otherwise and a perfectly clear limpid liquid is obtained which may be readily stirred or agitated until thoroughly mixed. The entire solution or mixture is then allowed to cool when the nitrotartaric acid will precipitate or separate in the form of large crystals which may be readily separated in an almost pure form from the acid mother liquor, and this mother liquor may be recovered for other uses.

The amount of water employed when the tartaric acid is to be dissolved, the volume of mixed acid and the strength of the mixed acid, together with the amount of added sulphuric acid, may be varied within wide limits; the essential features of the process being, first, to dissolve the tartaric acid preferably in hot water, and then to allow the mixed mass to remain hot, but naturally under control as to temperature until the dissolved tartaric acid and mixed acid has been thoroughly combined. These two new features might appear questionable as it is unusual to add water to a dehydrating mixture, such as mixed acid essentially is, and it is also unusual to deliberately allow such a mixture to remain hot. For instance careful cooling during the entire operation has hitherto been almost axiomatic.

The present process or method, as already stated, may be carried out in varying forms. As an illustration 200 pounds of tartaric acid may be first dissolved in 100 pounds boiling water, and stirred until dissolved. The dissolved tartaric acid is then added to 1500 pounds of mixed acid, containing twenty-five per cent nitric acid. The entire mixture is then agitated and the temperature is maintained at approximately 75 degrees centigrade. When the entire mixture has been thoroughly stirred, it is cooled and the nitrotartaric acid will settle or precipitate in the form of large crystals, which may be readily separated in an almost pure form.

Another method equally successful consists in dissolving 200 pounds of tartaric acid in 200 pounds of warm water. The tartaric acid thus dissolved is stirred into 1000 pounds of mixed acid containing 40 per cent nitric acid. The mixture thus combined is then stirred or agitated while 800 pounds of fuming sulphuric acid is added. The temperature in this instance is also controlled by suitable means so that a predetermined temperature, for instance 75 degrees centigrade, is not exceeded. When the acids have been thoroughly mixed and combined cooling is resorted to, then precipitation or separation of the nitrotartaric acid form as crystals will take place.

While the present invention has been described as applied to tartaric acid, it is obvious that its application is not limited to this single compound as other hydroxyl compounds may be similarly treated.

Having thus described my invention, what I claim and desire to secure by Letters Patent is—

1. A method of manufacturing nitrotartaric acid, which comprises dissolving the tartaric acid in water, then mixing the dissolved tartaric acid with mixed nitric and sulphuric acid while agitating the same, and finally cooling the entire mixture to crystallize the nitrotartaric acid formed.

2. A method of manufacturing nitrotartaric acid, which comprises dissolving the tartaric acid in water, then mixing the dissolved tartaric acid with mixed nitric and sulphuric acid while agitating the same, maintaining the temperature of the dissolved tartaric and mixed acid at approximately 75 degrees centigrade during agitation and finally cooling the entire mixture to crystallize the nitrotartaric acid formed.

3. A method of manufacturing nitrotartaric acid which comprises dissolving the tartaric acid in hot water, then mixing the dissolved tartaric acid with mixed acid, to-wit, nitric and sulphuric acid, while agitating said mixed acids, maintaining the temperature during mixing and agitation at approximately 75 degrees centigrade, and finally cooling the entire mixture to crystallize the nitrotartaric acid formed.

4. A method of manufacturing nitrotartaric acid which comprises dissolving 200 pounds of tartaric acid in substantially 100 pounds of boiling water, then adding the hot dissolved tartaric acid to 1500 pounds of mixed nitric and sulphuric acid, containing 25 per cent nitric acid, while agitating said mixed acid, maintaining the temperature during mixing and agitation at approximately 75 degrees centigrade, and finally cooling the entire mixture to crystallize the nitrotartaric acid formed.

5. A method of manufacturing nitrotartaric acid and like compounds, which comprises dissolving tartaric acid and mixing the solution with a mixture of nitric and sulphuric acid, then agitating and heating the entire mixture until the tartaric acid has become nitrated, and then cooling the entire mixture to crystallize the nitrotartaric acid formed.

6. A method of nitrating organic hydroxyl compounds whose nitro-products will crystallize which comprises dissolving the compound, mixing the solution with mixed nitric sulphuric acid while agitating the same, and finally cooling the entire mixture to crystallize the nitro compound that is formed.

ARTHUR LACHMAN.